United States Patent
Kawama et al.

(10) Patent No.: US 7,504,476 B2
(45) Date of Patent: Mar. 17, 2009

(54) POLY(ARYLENE SULFIDE) AND PRODUCTION PROCESS THEREOF

(75) Inventors: Hirohito Kawama, Fukushima (JP);
Mitsuhiro Matsuzaki, Fukushima (JP);
Michihisa Miyahara, Fukushima (JP);
Koichi Suzuki, Fukushima (JP);
Hiroyuki Sato, Fukushima (JP)

(73) Assignee: Kureha Corporation, Tokyo (JP)

( * ) Notice: Subject to any disclaimer, the term of this patent is extended or adjusted under 35 U.S.C. 154(b) by 596 days.

(21) Appl. No.: 10/542,543

(22) PCT Filed: Jan. 21, 2004

(86) PCT No.: PCT/JP2004/000477

§ 371 (c)(1),
(2), (4) Date: Jul. 18, 2005

(87) PCT Pub. No.: WO2004/065457

PCT Pub. Date: Aug. 5, 2004

(65) Prior Publication Data

US 2006/0074219 A1    Apr. 6, 2006

(30) Foreign Application Priority Data

Jan. 21, 2003  (JP) ............................. 2003-011760
Dec. 26, 2003  (JP) ............................. 2003-435562

(51) Int. Cl.
*C08G 75/14* (2006.01)
*C08G 75/00* (2006.01)
*C08G 75/02* (2006.01)

(52) U.S. Cl. ....................... 528/388; 528/373; 528/489; 528/499; 528/503

(58) Field of Classification Search ................. 528/373, 528/388, 489, 499, 503
See application file for complete search history.

(56) References Cited

U.S. PATENT DOCUMENTS

| | | | |
|---|---|---|---|
| 4,645,826 | A | 2/1987 | Iizuka et al. |
| 4,767,841 | A | 8/1988 | Goetz et al. |
| 4,786,711 | A | 11/1988 | Senatore et al. |
| 4,794,164 | A | 12/1988 | Iwasaki et al. |
| 4,810,773 | A | 3/1989 | Ogata et al. |
| 5,840,830 | A | 11/1998 | Miyahara et al. |

FOREIGN PATENT DOCUMENTS

| | | |
|---|---|---|
| EP | 0215312 | 3/1987 |
| EP | 0259984 | 3/1988 |
| JP | 61007332 | 1/1986 |
| JP | 62043422 | 2/1987 |
| JP | 63046228 | 2/1988 |
| JP | 63243134 | 10/1988 |
| JP | 63289025 | 11/1988 |
| JP | 01245030 | 9/1989 |
| JP | 02160834 | 6/1990 |
| JP | 02302436 | 12/1990 |
| JP | 05271414 | 10/1993 |
| JP | 09286861 | 11/1997 |
| JP | 2001040090 | 2/2001 |
| JP | 2001181394 | 7/2001 |

*Primary Examiner*—Duc Truong
(74) *Attorney, Agent, or Firm*—Porter Wright Morris & Arthur LLP

(57) ABSTRACT

A dehydration step is conducted by heating a mixture containing an organic amide solvent and a sulfur source including an alkali metal hydrosulfide, and a part of an overall charged amount of an alkali metal hydroxide as needed. The mixture remaining within the system after the dehydration step is mixed with a dihalo-aromatic compound, the resultant mixture is heated to conduct a polymerization reaction, and the alkali metal hydroxide is added to the mixture for polymerization reaction continuously or in portions to control the pH of the mixture for polymerization reaction within a range of from 7 to 12.5 from the beginning to the end of the polymerization reaction. The poly(arylene sulfide) according to the present invention has a nitrogen content of at most 800 ppm.

11 Claims, No Drawings

0
POLY(ARYLENE SULFIDE) AND PRODUCTION PROCESS THEREOF

RELATED APPLICATION

The present application is a §371 of PCT/JP2004/000477 filed Jan. 21, 2004.

TECHNICAL FIELD

The present invention relates to a production process of a poly(arylene sulfide) by subjecting a sulfur source and a dihalo-aromatic compound to a polymerization reaction in an organic amide solvent, and particularly to a process for stably producing a high-purity poly(arylene sulfide) at high yield by using a sulfur source including an alkali metal hydrosulfide in combination with an alkali metal hydroxide and inhibiting side reactions and decomposition reactions. The present invention also relates to high-purity poly(arylene sulfides).

In the poly(arylene sulfides) obtained by the production process of the present invention, the content of low-boiling impurities that form the cause of generation of gasses upon melt processing is markedly reduced, and so they permit providing high-performance and high-quality molded and processed products. The poly(arylene sulfides) according to the present invention are extremely low in the content of nitrogen generated by decomposition and side reactions of an organic amide solvent. Therefore, the poly(arylene sulfides) according to the present invention are little in variations of melt viscosity attending on difference in a washing treatment after polymerization, or the like and are thus permitted to have a stable melt viscosity.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical properties, electrical properties, dimensional stability and the like. The PASs are commonly used in a wide variety of fields such as electrical and electronic equipments and automotive equipments because they can be molded or formed into various kinds of molded or formed products, films, sheets, fibers, etc. by general melt processing techniques such as extrusion molding, injection molding and compression molding.

As a typical production process of a PAS, is known a process in which a sulfur source is reacted with a dihalo-aromatic compound in an organic amide solvent such as N-methyl-2-pyrrolidone. There is known a method of using an alkali metal hydrosulfide and an alkali metal hydroxide in combination as materials for a sulfur source. According to this method, however, the organic amide solvent is easy to be decomposed because the alkali metal hydroxide is used at a high concentration in the polymerization reaction. In addition, decomposition products form the cause of side reactions. For example, when N-methyl-2-pyrrolidone is used as an organic amide solvent, it is decomposed by the alkali metal hydroxide present at a high concentration to form a salt of a methylaminoalkylcarboxylic acid, which causes a side reaction. When a decomposition produce of the organic amide solvent is formed, it is difficult to control the side reaction by the decomposition product.

There have heretofore been proposed processes for producing a PAS, in the terminal of which a functional group has been introduced, by utilizing the fact that an alicyclic amide compound is decomposed by an alkali metal hydroxide to form a compound having a hydrolyzed structure (for example, Japanese Patent Application Laid-Open Nos. 2001-40090 and 2001-181394). Japanese Patent Application Laid-Open No. 2001-40090 describes a production process of a PAS, comprising reacting a polyhalo-aromatic compound, an alicyclic amide compound and an alkali metal hydroxide in the presence of water to hydrolyze the alicyclic amide compound, and then adding a sulfidating agent (i.e., an alkali metal hydrosulfide and/or an alkali metal sulfide) into the system to conduct polymerization. Japanese Patent Application Laid-Open No. 2001-40090 describes the fact that a PAS containing a carboxyalkylamino group of a structure that the alicyclic amide compound is hydrolyzed was obtained by this production process.

According to this process, a functional group can be introduced into a terminal of the PAS, but a side reaction is easy to take place, and the content of low-boiling impurities in the PAS formed is increased. As a result, when the PAS obtained by the above-described process is subjected to melt processing, a great amount of gasses are generated to clog an exhaust line in a melt-processing apparatus or facilitate production of voids in a molded or formed product. When the voids are produced in the molded product, the physical properties and surface properties thereof are deteriorated.

The above-described tendency may be generally observed not only in the production process described in the above document, but also in the case where an alkali metal hydrosulfide is used as a sulfur source, and an alkali metal hydroxide is used at a higher molar ratio than the alkali metal hydrosulfide for the purpose of providing a PAS having a high melt viscosity. On the other hand, when the alkali metal hydroxide is used at a lower molar ratio than the alkali metal hydrosulfide, the polymerization reaction system becomes unstable, and so the decomposition reaction is caused to easily progress. In any event, in conventional production processes, a molar ration of the alkali metal hydroxide to the alkali metal hydrosulfide is made excessively high in a polymerization reaction to conduct the polymerization reaction, so that side reactions are easy to progress, and difficulty is encountered on production of a high-purity PAS at high yield.

Specific examples are additionally mentioned. There have heretofore been proposed production processes of PAS, in which an alkali metal hydrosulfide, an alkali metal hydroxide and a polyhalo-aromatic compound are reacted by 2 stages (for example, Japanese Patent Application Laid-Open Nos. 2-302436 and 5-271414) In Japanese Patent Application Laid-Open No. 2-302436, it is described that the amount of the alkali metal hydroxide used is within a range of 0.7 to 1.3 mol, preferably 0.9 to 1.1 mol per mol of the alkali metal hydrosulfide. In Examples of Japanese Patent Application Laid-open No. 2-302436, is shown an experimental example that 0.92 mol of sodium hydroxide was mixed at a time with 1 mol of sodium hydrosulfide to use it. Japanese Patent Application Laid-Open No. 5-271414 also discloses a like technical matter. According to these processes, however, it is difficult to efficiently advance the polymerization reaction while inhibiting decomposition reactions and side reactions.

There has heretofore been proposed a production process of poly(p-phenylene sulfide), in which a molar ratio of an alkali metal hydroxide to an alkali metal hydrogensulfide is controlled to 0.80:1 to 0.98:1 to conduct polymerization by one stage (for example, Japanese Patent Publication No. 6-51792). According to this process, however, decomposition reactions are easy to occur, and difficulty is encountered on stably performing a polymerization reaction because the ratio of the alkali metal hydroxide to the alkali metal hydrogensulfide (i.e., alkali metal hydrosulfide) is too low.

There has been proposed a production process of PAS, in which an alkali metal hydroxide is used in a proportion amounting to at most 1 mol per mol of an alkali metal hydrosulfide to conduct polymerization by one stage (for example, Japanese Patent Application Laid-Open No. 2001-181394). There has also been proposed a production process of PAS by one stage by using an alkali metal hydrosulfide and an alkali metal hydroxide to specify a molar ratio between the respective components (for example, Japanese Patent Application Laid-Open No. 2-160834). There has further been proposed a process for producing PAS by one stage by controlling the amount of an alkali metal hydroxide added to 0.3 to 4 mol per mol of an alkali metal hydrosulfide (for example, Japanese Patent Publication No. 6-51793). However, these processes also involve the same problems as in the processes disclosed in Japanese Patent Application Laid-Open Nos. 2-302436 and 5-271414.

Further, the melt viscosities of conventional PASs obtained by polymerizing the sulfur source and the dihalo-aromatic compound in the presence of the alkali metal hydroxide in the organic amide solvent markedly vary with difference in washing method after polymerization or difference in resin pH even when the PASs are the same kind. In particular, a PAS whose pH is alkaline after washing undergoes a sort of ionic crosslinking by an alkali metal ion such as a sodium ion, and so its melt viscosity becomes markedly high compared with an acidic PAS. When such a PAS is subjected to melt processing such as melt spinning, it is difficult to stably conduct an operation due to variations of melt viscosity during the processing.

DISCLOSURE OF THE INVENTION

It is an object of the present invention to provide, in a production process of a poly(arylene sulfide) by polymerizing a sulfur source and a dihalo-aromatic compound in the presence of an alkali metal hydroxide in an organic amide solvent, a process for stably producing a high-purity poly (arylene sulfide) at high yield by using a sulfur source including an alkali metal hydrosulfide as the sulfur source and inhibiting side reactions during a polymerization reaction.

Another object of the present invention is to provide a poly(arylene sulfide) high in purity, low in nitrogen content and little in variations of melt viscosity due to differences in washing liquid and resin pH.

In a polymerization reaction for obtaining a PAS, a growth reaction and a side reaction competitively take place. When the side reaction more strongly takes place, the formation of impurities in the polymerization reaction system and the inhibition of the growth of a polymer are incurred, so that the heat stability of the resulting PAS is deteriorated, and coloring is caused.

The present inventors have carried out an extensive investigation as to polymerization reactions for obtaining PASs. As a result, it has been found that a decomposition reaction of a PAS is easy to take place when a pH within the polymerization reaction system becomes too low, while a polymerization reaction for obtaining a PAS is allowed to normally progress as the pH within the polymerization reaction system becomes higher, but a side reaction is easy to occur when a pH within the polymerization reaction system becomes too high, and so the content of low-boiling impurities in the PAS formed is increased.

Thus, the present inventors have carried out a further investigation. As a result, it has been found that a production process comprising polymerizing a sulfur source including an alkali metal hydrosulfide and a dihalo-aromatic compound in the presence of an alkali metal hydroxide in an organic amide solvent is adopted, and at this time, the alkali metal hydroxide is added continuously or in plural portions in a dehydration step and a polymerization step to control the pH within the polymerization reaction system within a specific limited range, whereby decomposition reactions and side reaction cans be effectively inhibited to produce a high-purity PAS extremely low in the content of impurities at high yield.

According to the production process of the present invention, a PAS markedly reduced in the content of low-boiling impurities can be produced with high production efficiency and without deterioration of profitability due to loss of raw materials, or the like. According to the production process of the present invention, a PAS having a high molecular weight (high melt viscosity) can be produced. According to the present invention, there is further provided a PAS low in nitrogen content, little in variations of melt viscosity due to differences in washing liquid and resin pH and stably having a desired melt viscosity. The present invention has been led to completion on the basis of these findings.

According to the present invention, there is thus provided a process for producing a poly(arylene sulfide) by polymerizing a sulfur source and a dihalo-aromatic compound in the presence of an alkali metal hydroxide in an organic amide solvent, which comprises:

(1) a dehydration step of charging, into a reaction vessel, the organic amide solvent and the sulfur source including an alkali metal hydrosulfide, and a part of an overall charged amount of the alkali metal hydroxide as needed, and heating a mixture containing these components to discharge at least a part of a distillate containing water from the interior of the system containing the mixture to the exterior of thee system, and (2) a polymerization step of mixing the mixture remaining within the system after the dehydration step with a dihaloaromatic compound, heating a mixture for polymerization reaction containing these components to subject the sulfur source (hereinafter referred to as "available sulfur source") and the dihalo-aromatic compound to a polymerization reaction, and adding the alkali metal hydroxide to the mixture for polymerization reaction continuously or in portions to control the pH of the mixture for polymerization reaction within a range of from 7 to 12.5 from the beginning to the end of the polymerization reaction.

According to the present invention, there is also provided a poly(arylene sulfide) obtained by polymerization in an organic amide solvent and having a nitrogen content of at most 800 ppm.

According to the present invention, there is further provided a poly(arylene sulfide) having a ratio MVL/MVH of a melt viscosity MVL (as measured at a temperature of 310° C. and a shear rate of 1,216 $sec^{-1}$) of the poly(arylene sulfide), whose pH is adjusted to at most 6.0, to a melt viscosity MVH (as measured at a temperature of 310° C. and a shear rate of 1,216 $sec^{-1}$) of the same poly(arylene sulfide), whose pH is adjusted to at least 8.0, ranging from 0.7 to 1.0.

According to the present invention, there is still further provided a poly(arylene sulfide) obtained by polymerization in an organic amide solvent and having a nitrogen content of at most 800 ppm and a ratio MVL/MVH of a melt viscosity MVL (as measured at a temperature of 310° C. and a shear rate of 1,216 $sec^{-1}$) of the poly(arylene sulfide), whose pH is adjusted to at most 6.0, to a melt viscosity MVH (as measured at a temperature of 310° C. and a shear rate of 1,216 $sec^{-1}$) of the same poly(arylene sulfide), whose pH is adjusted to at least 8.0, ranging from 0.7 to 1.0.

BEST MODE FOR CARRYING OUT THE INVENTION

1. Sulfur Source:

In the present invention, a sulfur source including an alkali metal hydrosulfide is used as a sulfur source. As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. The alkali metal hydrosulfide may be used in any form of an anhydride, a hydrate and an aqueous solution. Among these, sodium hydrosulfide is preferred in that it is industrially available on the cheap and easy to handle. The alkali metal hydrosulfide is preferably used as an aqueous mixture (i.e., a mixture with water having fluidity) such as an aqueous solution from the viewpoints of processing operation, metering, etc.

The alkali metal hydrosulfide may be used substantially singly as the sulfur source including the alkali metal hydrosulfide. However, a mixture of the alkali metal hydrosulfide and an alkali metal sulfide may also be used. The substantially single alkali metal hydrosulfide means not only the alkali metal hydrosulfide alone but also a case where an alkali metal sulfide is contained in an amount of at most 5 mol %.

The alkali metal hydrosulfide is generally synthesized by a reaction of hydrogen sulfide with an alkali metal hydroxide and may often contain a small amount of an alkali metal sulfide according to conditions for the synthesis. The alkali metal hydrosulfide tends to become a stable state when it contains a small amount of the alkali metal sulfide. Further, the content of the alkali metal sulfide is preferably not very high even from the viewpoint of easy control of the pH of the mixture for polymerization reaction.

When the mixture of the alkali metal hydrosulfide and the alkali metal sulfide is used as the sulfur source, thus, the mixture is preferably a mixture comprising the alkali metal hydrosulfide as a main component, more preferably a mixture containing at least 51 mol % of the alkali metal hydrosulfide and at most 49 mol % of the alkali metal sulfide.

Further, when the sulfur source is a mixture of the alkali metal hydrosulfide and the alkali metal sulfide, the composition thereof is preferably composed of 70 to 99.5 mol % of the alkali metal hydrosulfide and 0.5 to 30 mol % of the alkali metal sulfide, more preferably 90 to 99.5 mol % of the alkali metal hydrosulfide and 0.5 to 10 mol % of the alkali metal sulfide, still more preferably 95 to 99.5 mol % of the alkali metal hydrosulfide and 0.5 to 5 mol % of the alkali metal sulfide, particularly preferably 97 to 99.5 mol % of alkali metal hydrosulfide and 0.5 to 3 mol % of the alkali metal sulfide.

As examples of the alkali metal sulfide, may be mentioned lithium sulfide, sodium sulfide, potassium sulfide, rubidium sulfide, cesium sulfide and mixtures of two or more compounds thereof. The alkali metal sulfide may be used in any form of an anhydride, a hydrate and an aqueous solution. Among these, sodium sulfide is preferred in that it is industrially available on the cheap and easy to handle. As these alkali metal sulfides, may also be used those generally marketed in the form of a hydrate in addition to those contained in alkali metal hydrosulfides as by-products. Examples of the hydrate of the alkali metal sulfide include sodium sulfide nonahydrate ($Na_2S \cdot 9H_2O$) and sodium sulfide pentahydrate ($Na_2S \cdot 5H_2O$) The alkali metal sulfide is preferably used as an aqueous mixture (i.e., a mixture with water having fluidity) such as an aqueous solution from the viewpoints of processing operation, metering, etc.

2. Alkali Metal Hydroxide:

Examples of the alkali metal hydroxide include lithium hydroxide, sodium hydroxide, potassium hydroxide, rubidium hydroxide, cesium hydroxide and mixtures of two or more compounds thereof. Among these, sodium hydroxide is preferred in that it is industrially available on the cheap. The alkali metal hydroxide is preferably used as an aqueous mixture (i.e., a mixture with water having fluidity) such as an aqueous solution from the viewpoint of handling property such as metering.

3. Dihalo-aromatic Compound:

The dihalo-aromatic compound used in the present invention is a dihalogenated aromatic compound having 2 halogen atoms directly bonded to the aromatic ring. Specific examples of the dihalo-aromatic compound include o-dihalobenrzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide and dihalodiphenyl ketone.

Here, the halogen atom means each of fluorine, chlorine, bromine and iodine atoms, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.20 mol, more preferably 1.00 to 1.09 mol per mol of the sulfur source (i.e. available sulfur source) contained in the mixture remaining in the system after the dehydration step.

4. Molecular Weight Regulator, Branching or Crosslinking Agent:

In order to, for example, form a terminal of a PAS formed or regulate a polymerization reaction or a molecular weight, a monohalo-compound (may not be always an aromatic compound) may be used in combination. In order to form a branched or crosslinked polymer, a polyhalo-compound (may not be always an aromatic compound), to which at least 3 halogen atoms are bonded, an active hydrogen-containing halogenated aromatic compound, a halogenated aromatic nitro compound or the like may also be used in combination. A preferable example of the polyhalo-compound as a branching or crosslinking agent includes trihalobenzene.

5. Organic Amide Solvent:

In the present invention, an organic amide solvent that is an aprotic polar organic solvent is used as a solvent for the dehydration reaction and polymerization reaction. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compound such as N-methyl-2-pyrrolidone and N-cyclohexyl-2-pyrrolidone; N,N-dialkyl-imidazolidinone compounds such as 1,3-dialkyl-2-imidazolidinones; tetraalkylurea compounds such as tetramethylurea; and hexaalkylphosphoric triamide compounds such as hexamethylphosphoric triamide.

These organic amide solvents may be used either singly or in any combination thereof. Among these organic amide solvents, N-alkylpyrrolidone compounds, N-cycloalkylpyrrolidone compounds, N-alkylcaprolactam compounds and N,N-dialkylimidazolidinone compounds are preferred, with N-methyl-2-pyrrolidone being particularly preferred. The amount of the organic amide solvent used in the polymerization reaction in the present invention is generally within a range of 0.1 to 10 kg per mol of the available sulfur source.

6. Polymerization Aid:

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PASs. Among these, metal salts of organic carboxylic acids are particularly preferred because they are cheap. The amount of the polymerization aid added varies with the kind of the compound used. However, it is generally within a range of 0.01 to 10 mol per mol of the available sulfur source.

7. Dehydration Step:

Raw materials such as a sulfur source contain water such as water of hydration (water of crystallization). a water medium is also contained when they are used aqueous mixtures. The polymerization reaction between the sulfur source and the dihalo-aromatic compound is affected by the content of water existing in the polymerization reaction system. A dehydration step is thus arranged prior to a polymerization step to control the water content in the reaction system.

In the dehydration step, a mixture containing the organic amide solvent and the sulfur source including the alkali metal hydrosulfide, and a part of an overall charged amount of the alkali metal hydroxide as needed is heated, desirably, under an inert gas atmosphere to discharge at least a part of a distillate containing water from the interior of the system containing the mixture to the exterior of the system. The dehydration step is conducted within a reaction vessel, and the discharge of the distillate to the exterior of the system is generally conducted by discharge out of the reaction vessel. Examples of water to be dehydrated in the dehydration step include water of hydration contained in the respective raw materials charged in the dehydration step, a water medium of the aqueous mixture and water secondarily produced by a reaction between the respective raw materials.

The charging of the respective raw materials into the reaction vessel is conducted within a temperature range of generally from ordinary temperature (about 20° C.) to 300° C., preferably from ordinary temperature to 200° C. The charging of the raw materials may not be in order, and the respective raw materials may be additionally charged in the course of the dehydration process. An organic amide solvent is used in the dehydration step. The organic amide solvent used in the dehydration step is preferably the same as the organic amide solvent used in the polymerization step, with N-methyl-2-pyrrolidone being more preferred in that it is easy to be industrially available. The amount of the organic amide solvent used is generally about 0.1 to 10 kg per mol of the sulfur source charged into the reaction vessel.

The dehydration process is conducted by charging the raw material into the reaction vessel and then heating the mixture containing the respective components in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system thereof. An apparatus for conducting the dehydration step may be the same as a reaction vessel (reactor) used in the polymerization step or different from it.

In the dehydration step, water and the organic amide solvent are distilled out in the form of vapor. Accordingly, a distillate contains water and the organic amide solvent. A part of the distillate may be refluxed into the reaction vessel for the purpose of inhibiting the discharge of the organic amide solvent out of the system. However, at least a part of the distillate containing water is discharged out of the system for the purpose of controlling the water content. A minor amount of the organic amide solvent is discharged together with water out of the system when the distillate is discharged out of the system.

In this dehydration step, hydrogen sulfide resulting from the sulfur source is volatilized out. In the dehydration step, the mixture is heated, the sulfur source is caused to react with water by the heating to form hydrogen sulfide and an alkali metal hydroxide, and gaseous hydrogen sulfide is volatized out. For example, 1 mol of an alkali metal hydrosulfide reacts with 1 mol of water to form 1 mol of hydrogen sulfide and 1 mol of an alkali metal hydroxide. The hydrogen sulfide volatilized out is also discharged out of the system attending on the discharging of at least a part of the distillate containing water.

The amount of the sulfur source in the mixture remaining in the system after the dehydration step becomes smaller than the amount of the sulfur source charged. When a sulfur source comprising the alkali metal hydrosulfide as a main component is used, the amount of the sulfur source in the mixture remaining in the system after the dehydration step is substantially equal to a value obtained by subtracting a molar amount of hydrogen sulfide volatilized out of the system from a molar amount of the sulfur source charged. In the present invention, the sulfur source in the mixture remaining in the system after the dehydration step is referred to as "available sulfur source". In other words, this available sulfur source may be said to be a substantial "charged sulfur source".

The available sulfur source after the dehydration step is interpreted as a mixture containing the alkali metal hydrosulfide, the alkali metal sulfide and the like. However, no particular limitation is imposed on the specific form thereof. Since it has heretofore been said that when an alkali metal hydrosulfide and an alkali metal hydroxide are heated in an organic amide solvent, they react with each other in situ to form an alkali metal sulfide (see, for example, Japanese Patent Application Laid-Open No. 9-286861), there is a possibility that when an alkali metal hydroxide is added in the dehydration step, an alkali metal sulfide may be formed by the reaction of the alkali metal hydrosulfide with the alkali metal hydroxide.

On the other hand, according to the results of recent researches on polymerization mechanisms of PASs, it is inferred that an alkali metal hydrosulfide reacts with an organic amide solvent by heating to form an alkali metal alkylaminoalkylcarboxylate, and this alkali metal alkylaminoalkylcarboxylate forms a complex with an alkali metal hydrosulfide.

Accordingly, no particular limitation is imposed on the specific form of the available sulfur source as the compound, but it is sure that the available sulfur source is subjected to a polymerization reaction with the dihalo-aromatic compound to form a PAS, and a molar ratio of the available sulfur source to the dihalo-aromatic compound greatly affects the polymerization reaction. Since the amount of the sulfur source charged first in the dehydration step is reduced due to volatilization of hydrogen sulfide out of the system after the dehydration step, it is necessary to determine an amount of the sulfur source (available sulfur source) contained in the mixture remaining in the system after the dehydration step on the basis of the amount of hydrogen sulfide volatilized out of the system. It is important to exactly determine the amount of the available sulfur source in that a molar ratio of the available sulfur source to the alkali metal hydroxide and a molar ratio of the available sulfur source to the dihalo-aromatic compound are controlled.

In the dehydration step, the dehydration is conducted until the content of water comprising water of hydration, a water medium, secondarily produced water, etc. is lowered within a range of necessary amounts. In the dehydration step, the dehydration is desirably conducted until the water content in the polymerization reaction system is reduced to 0.0 to 2.0 mol per mol of the available sulfur source. When the water content has become too low in the dehydration step, water may be added prior to the polymerization step to regulate the water content to a desired value.

In the dehydration step, no alkali metal hydroxide is added, or a part of the amount charged thereof is added. In the dehydration step and polymerization step, the overall charged amount of the alkali metal hydroxide per mol of the available sulfur source is desirably controlled in such a manner that a $\Sigma$ OH value falls within a range of 1.0 to 1.1 mol. The overall charged amount of the alkali metal hydroxide is a value calculated out at the time the polymerization has been completed.

In the present invention, the $\Sigma$ OH value is a value calculated out on the basis of the total molar amount of the alkali metal hydroxide added from the charging of the sulfur source to the completion of the polymerization reaction in the production process of the present invention making use of the sulfur source including the alkali metal hydrosulfide. From the viewpoint of precisely controlling the pH of the mixture for polymerization reaction, however, it means a cumulative molar amount of (i) a molar amount of the alkali metal sulfide contained in the sulfur source charged in the dehydration step, (ii) a molar amount of the alkali metal hydroxide added in the dehydration step, (iii) a molar amount of hydrogen sulfide volatilized out of the system in the dehydration step and (iv) a molar amount of the alkali metal hydroxide added continuously or in portions in the polymerization step.

The alkali metal sulfide forms an alkali metal hydroxide by its equilibrium reaction with water. In the production process of the present invention making use of the sulfur source comprising the alkali metal hydrosulfide as a main component, a molar ratio of the overall charged amount of the alkali metal hydroxide to 1 mol of the available sulfur source is thus calculated out in view of the amount of the alkali metal sulfide that is a minor component. When hydrogen sulfide is volatilized out of the system in the dehydration step, an alkali metal hydroxide in an amount almost equal to the number of moles of the hydrogen sulfide volatilized out is formed. Therefore, the molar ratio of the overall charged amount of the alkali metal hydroxide to 1 mol of the available sulfur source is calculated out in view of the amount of the hydrogen sulfide volatilized out as well.

The overall charged amount of the alkali metal hydroxide is an amount that the $\Sigma$ OH value falls within a range of generally 1.0 to 1.1 mol, preferably 1.01 to 1.09 mol, more preferably 1.02 to 1.08 mol per mol of the available sulfur source. Since an alkali metal hydrosulfide used as a raw material of the sulfur source often contains a small amount of an alkali metal sulfide, the overall charged amount of the alkali metal hydroxide varies even with the content of the alkali metal sulfide contained in the alkali metal hydrosulfide used. It is thus desirable to conduct a precise compositional analysis as to the alkali metal hydrosulfide used in advance. It is important that the amount of the hydrogen sulfide volatilized out of the system in the dehydration step is precisely determined to precisely determine the amount of an alkali metal hydroxide formed in the system.

When a part of the alkali metal hydroxide is added in the dehydration step, the alkali metal hydroxide is desirably added in such a manner that the $\Sigma$ OH value is in a proportion of preferably lower than 1.1 mol, more preferably at most 0.8 mol, still more preferably at most 0.5 mol, particularly preferably at most 0.2 mol to 1 mol of the available sulfur source. When in the dehydration step, no alkali metal hydroxide is added, or the amount added is lessened, the dehydration can be efficiently conducted. The rate of polymerization becomes faster as the water content is lower, and so an advantage is gained from the viewpoints of increase in molecular weight and productivity.

8. Polymerization Step:

The polymerization step comprises mixing the mixture remaining in the system after the dehydration step with a dihalo-aromatic compound, heating a mixture for polymerization reaction containing these components to subject the available sulfur source and the dihalo-aromatic compound to a polymerization reaction, and adding an alkali metal hydroxide to the mixture for polymerization reaction continuously or in portions to control the pH of the mixture for polymerization reaction within a range of 7 to 12.5 from the beginning to the end of the polymerization reaction.

When a polymerization vessel different from the reaction vessel used in the dehydration step is used in the polymerization step, the mixture after the dehydration step and the dihalo-aromatic compound are charged into the polymerization vessel. Before the polymerization step, the amount of the organic amide solvent and the content of water may be controlled as needed. Before the polymerization step or during the polymerization step, a polymerization aid and additives such as a phase-separating agent for phase-separating a PAS formed from a liquid polymerization reaction mixture may be mixed.

The mixing of the mixture remaining in the system after the dehydration step with the dihalo-aromatic compound is conducted within a temperature range of generally from 100 to 350° C., preferably from 120 to 330° C. When the respective components are charged into the polymerization vessel, no particular limitation is imposed on the order of charging, and both components are charged in small portions or at a time.

The polymerization reaction is generally conducted within a range of from 170 to 290° C. The polymerization reaction is preferably conducted by a two-stage process, which will be described subsequently, in that a high-molecular weight PAS is efficiently produced. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally from 0.1 to 10 kg, preferably from 0.15 to 1 kg per mol of the available sulfur source existing in the polymerization step. The amount may be changed in the course of the polymerization reaction so far as it falls within this range.

The rate of polymerization becomes faster as the water content upon the beginning of the polymerization reaction is lower, and so an advantage is gained from the viewpoints of increase in the molecular weight of a PAS formed and productivity. Accordingly, the water content upon the beginning of the polymerization reaction is desirably controlled within a range of preferably 0.0 to 2.0 mol, more preferably 0.0 to 1.0 mol, still more preferably 0.0 to 0.5 mol per mol of the available sulfur source. As needed, the water content in the polymerization reaction system may be more increased than the above range with the progress of the polymerization reaction.

In the production process according to the present invention, no alkali metal hydroxide is added in the dehydration step, or a part of the overall amount charged thereof is added. When no alkali metal hydroxide is added in the dehydration step, the overall amount charged thereof is thus added in the polymerization step. When a part of the alkali metal hydroxide is added in the dehydration step, the remaining alkali metal hydroxide is added in the polymerization step. The term "alkali metal hydroxide" as used herein means an alkali metal hydroxide actually added, and the molar amount thereof is cumulated upon the calculation of the $\Sigma$ OH value.

The addition of the alkali metal hydroxide in the polymerization step is conducted by adding the alkali metal hydroxide to the mixture for polymerization reaction continuously or in portions, whereby the pH of the mixture for polymerization reaction is controlled within a range of from 7 to 12.5 from the beginning to the end of the polymerization reaction. The point of time the polymerization reaction is begun means a point of time the dihalo-aromatic compound is charged, and the heating is begun, while the point of time the polymerization reaction is ended means a point of time the heating has been ended.

The method of continuously adding the alkali metal hydroxide means a method of continuously adding the alkali metal hydroxide little by little into the polymerization reaction system. As the method of adding the alkali metal hydroxide in portions, a method of adding the alkali metal hydroxide in plural portions into the polymerization reaction system is typical. Besides, a method of continuously adding a part thereof and intermittently adding the remainder is also included.

When a part of the overall amount charged of the alkali metal hydroxide is added in the dehydration step, this addition also counts among the number of times of the addition in portions in the method of adding the alkali metal hydroxide in portions. In other words, when a part of the alkali metal hydroxide is added in the dehydration step, a mode of adding the remaining alkali metal hydroxide at a time at a proper point of time in the polymerization step is included in the addition in portions. The continuous addition and the addition in portions of the alkali metal hydroxide may be performed at a necessary point of time between beginning and end of the polymerization. In other words, the time of the addition of the alkali metal hydroxide is not limited so far as the pH of the reaction mixture can be controlled within the range of from 7 to 12.5 from the beginning to the end of the polymerization reaction.

It is essential to control the pH of the mixture (i.e., the reaction mixture) for polymerization reaction within the range of from 7 to 12.5 in the polymerization step in that side reactions and decomposition reactions are effectively inhibited to efficiently produce a high-purity PAS low in the content of impurities. The pH of the reaction mixture means a value obtained by collecting the reaction mixture, diluting it to 1/10 with ion-exchanged water and measuring a pH of the diluted solution.

If the pH of the reaction mixture in the polymerization step is too low, a decomposition reaction of a PAS formed is easy to occur though a decomposition reaction of the organic amide solvent is inhibited, so that difficulty is encountered on the formation of a high-molecular weight PAS, and the polymerization reaction cannot be continued in an extreme case. If the pH of the reaction mixture in the polymerization reaction is too high, the decomposition reaction of the organic amide solvent is facilitated, and unpreferable side reactions are easy to occur though the polymerization reaction for obtaining a PAS is allowed to normally progress to easily obtain a high-molecular weight PAS. When the organic amide solvent is decomposed, for example, an aminoalkylcarboxylate is formed.

In order to satisfy both increase in the molecular weight of the PAS and inhibition of the decomposition reaction of the organic amide solvent, it is essential to control the pH of the reaction mixture within a range of from 7 to 12.5. The pH of the reaction mixture is preferably within a range of from 8 to 12.5, more preferably from 9 to 12.1. The pH of the reaction mixture is desirably not varied as much as possible from the viewpoint of stabilizing the quality of a PAS formed. Accordingly, with respect to the method of adding the alkali metal hydroxide, the method of continuously adding a fixed amount is preferred to the divisional method of intermittently adding. Since the rate of reaction varies even with conditions of the polymerization reaction system, such as reaction temperature and concentration of the reactive components, it is the most preferable process for obtaining a PAS having stable quality to continuously add the alkali metal hydroxide matching to the degree of progress of the reaction, for example, a conversion of the dihalo-aromatic compound.

As a preferable method for controlling the pH of the reaction mixture in the polymerization step, is mentioned a method of controlling the pH of the mixture for polymerization reaction within a range of from 7 to 12.5 from the beginning to the end of the polymerization reaction by adding the alkali metal hydroxide to the mixture for polymerization reaction continuously or in portions in the polymerization step so as to satisfy the following expression (I):

$$0 \leq y-x < 1.1 \quad (I)$$

wherein y=$\Sigma$ OH/available S ($\Sigma$ OH being a cumulative molar amount of a molar amount of an alkali metal sulfide contained in a sulfur source charged in the dehydration step, a molar amount of an alkali metal hydroxide added in the dehydration step, a molar amount of hydrogen sulfide volatilized out of the system in the dehydration step and a molar amount of an alkali metal hydroxide added continuously or in portions in the polymerization step, and the available S being a molar amount of an available sulfur source contained in the mixture remaining in the system after the dehydration step), and x is a consumption rate of a dihalo-aromatic compound, i.e., (a molar amount of the dihalo-aromatic compound consumed in the polymerization step)/(a molar amount of the dihalo-aromatic compound charged)].

The consumption rate of the dihalo-aromatic compound can be calculated out on the basis of a proportion of an amount of the dihalo-aromatic compound remaining at a certain point of time in the polymerization reaction to the charged amount thereof. The consumption rate of the dihalo-aromatic compound can be calculated out by sampling and analyzing the reaction mixture at regular time intervals. The relational expression is preferably $0 \leq y-x < 0.8$, more preferably $0 \leq y-x < 0.5$, particularly preferably $0 \leq y-x < 0.2$.

The method for controlling the PH in accordance with the expression (I) is particularly effective when a mixture composed of preferably 90 to 99.5 mol % of the alkali metal hydrosulfide and 0.5 to 10 mol % of the alkali metal sulfide, more preferably 95 to 99.5 mol % of the alkali metal hydrosulfide and 0.5 to 5 mol % of the alkali metal sulfide, particularly preferably 97 to 99.5 mol % of the alkali metal hydrosulfide and 0.5 to 3 mol % of the alkali metal sulfide is used as the sulfur source.

In the production process according to the present invention, the polymerization reaction is desirably conducted in the polymerization step by an at least two-stage polymerization process comprising:

(A) Step 1 of heating the mixture for polymerization reaction to 170 to 270° C. in the presence of water in a proportion of 0.0 to 2.0 mol per mol of the available sulfur source to conduct a polymerization reaction, thereby forming a prepolymer that a conversion of the dihalo-aromatic compound is 50 to 98%, and (B) Step 2 of controlling the amount of water in the mixture for polymerization reaction so as to bring about a state that water exists in a proportion of 2.0 to 10 mol per mol of the available sulfur source, and heating the reaction system to 245 to 290° C., thereby continuing the polymerization reaction.

When the two-stage polymerization process is adopted, however, it is necessary to control the pH of the reaction mixture in the respective step within the above-described range as described above. The conversion of the dihalo-aromatic compound can be measured and calculated out in accordance with the method known per se in the art as disclosed in, for example, Japanese Patent Publication No. 63-33775. In the first-stage polymerization step, it is desirable to form a prepolymer having a melt viscosity of 0.5 to 30 Pa.s as measured at a temperature of 310° C. and a shear rate of 1,216 $sec^{-1}$.

Water may be added at a second stage of the polymerization reaction or upon completion thereof to increase the water content for the purpose of lowering the contents of common salt secondarily produced and impurities in the polymer formed or collecting the polymer in the form of particles. The polymerization reaction system may be a batch system, a continuous system or a combination of both systems. In the batch-wise polymerization, 2 or more reaction vessels may be used for the purpose of shortening the polymerization cycle time.

9. Post Treatment Step:

In the production process according to the present invention, a post treatment after the polymerization reaction may be conducted in accordance with a method known per se in the art. For example, after completion of the polymerization reaction, a product slurry cooled is separated by filtration as it is or after diluted with water or the like, and the resulting filter cake is washed and filtered repeatedly, whereby a PAS can be collected. According to the production process of the present invention, a granular polymer can be formed, so that the granular polymer is preferably separated from the reaction mixture by a method of sieving the polymer by means of a screen because the polymer can be easily separated from by-products, oligomers, etc. The product slurry may be subjected to sieving as it is in a high-temperature state, thereby collecting the polymer.

After the separation (sieving) by filtration, the PAS is preferably washed with the same organic amide solvent as the polymerization solvent, or an organic solvent such as a ketone (for example, acetone) or an alcohol (for example, methanol). As the organic solvent, may be used an anhydride. However, a hydrous organic solvent is preferably used in order to more efficiently remove impurities. Acetone containing 1 to 20% by weight of water is more preferably used. The PAS may be washed with hot water. The PAS formed may also be treated with an acid or a salt such as ammonium chloride.

10. PAS:

According to the production process of the present invention, there can be provided a PAS markedly reduced in the content of low-boiling impurities that form the cause of generation of gasses upon melt processing. The content of such low-boiling impurities can be determined by measuring a weight loss on heating by means of a thermogravimetric analyzer. The PAS obtained by the production process according to the present invention is little in modification such as introduction of a terminal functional group attending on side reactions such as a decomposition reaction of the organic amide solvent. Even from this point of view, the PAS is a high-purity and high-quality polymer and is expected to develop its uses to fields of electronic instruments, fibers, etc. According to the production process of the present invention, a PAS having a high molecular weight (high melt viscosity) can also be produced.

The melt viscosity (as measured at a temperature of 310° C. and a shear rate of 1,216 $sec^{-1}$) of the PAS according to the present invention is generally 1 to 3,000 Pa·s, preferably 3 to 2,000 Pa·s, more preferably 10 to 1,500 Pa·s. If the melt viscosity of the PAS is too low, its mechanical properties become insufficient. If the melt viscosity is too high, its melt-flow characteristics are deteriorated to lower the molding or forming and processing ability thereof.

The melt viscosities of conventional PASs obtained by polymerizing a sulfur source and a dihalo-aromatic compound in the presence of an alkali metal hydroxide in an organic amide solvent markedly vary with difference in washing method or resin pH. For example, when a PAS is subjected to an acid treatment (treatment with an acid or a salt such as ammonium chloride) in a washing step after polymerization, the resin pH generally turns acidic. When the PAS is subjected to no washing with an acid or a treatment with an alkali such as sodium hydroxide on the other hand, the resin pH generally turns alkaline. A PAS whose pH is alkaline undergoes a sort of ionic crosslinking by an alkali metal ion such as a sodium ion existing in the polymerization reaction system as the alkalinity thereof is higher, and so its melt viscosity is detected high compared with the PAS whose pH is acidic.

The melt viscosity of the PAS is generally used as an index to its molecular weight (polymerization degree). As described above, the melt viscosity may vary according to conditions of washing. When the variations in the melt viscosity of the Pas are wide, in some cases, problems such as end breakage may arise upon, for example, melt spinning using the PAS, and variations in physical properties of processed products after melt processing may be caused.

On the other hand, the PAS according to the present invention has a ratio MVL/MVH of a melt viscosity MVL (as measured at a temperature of 310° C. and a shear rate of 1,216 $sec^{-1}$) of the PAS, whose pH is adjusted to at most 6.0 by control of washing conditions or the like, to a melt viscosity MVH (as measured at a temperature of 310° C. and a shear rate of 1,216 $sec^{-1}$) of the same PAS, whose pH is adjusted to at least 8.0, ranging from 0.7 to 1.0, preferably from 0.75 to 1.0, more preferably from 0.8 to 1.0, and so the PAS can be provided as that having a stable melt viscosity.

The reason why the PAS according to the present invention exhibits a stable melt viscosity is considered to be attributable to its markedly low nitrogen content. It is inferred that when a sulfur source and a dihalo-aromatic compound are polymerized in the presence of an alkali metal hydroxide in an organic amide solvent, the organic amide solvent such as N-methyl-2-pyrrolidone is reacted with the alkali metal hydroxide by heating to form an alkali metal alkylaminoalkylcarboxylate, and this alkali metal alkylaminoalkylcarboxylate participates in a polymerization reaction to form an atomic group containing a nitrogen atom and a carboxylic group at a terminal of a PAS formed.

For example, when NMP reacts with sodium hydroxide (NaOH), NMP is subjected to ring opening to form sodium methylaminobutanoate [(CH$_3$)NH—CH$_2$—CH$_2$—CH$_2$—COONa]. This compound reacts with p-dichlorobenzene that is a monomer to form sodium chlorophenylmethylaminobutanoate. It is considered that this sodium chlorophenylmethylamino-butanoate and/or sodium methylaminobutanoate participates in the polymerization reaction to form a methylaminobutanic group at a terminal of a PAS formed.

It is inferred that this terminal carboxyl group reacts with an alkali metal ion such as a sodium ion existing in the polymerization reaction system or a sodium ion contained in an alkaline washing liquid to form a salt such as —COONa, and this alkali metal such as Na has high cationic nature and thus forms a pseudo-crosslinking (a sort of ionic crosslinking) with a sulfur atom (S) having plural unshared electron pairs in a PAS molecule or a benzene ring having a great number of free electrons, whereby the melt viscosity of the PAS becomes high.

The PAS of the present invention, which has been obtained by polymerizing preferably a sulfur source and a dihalo-aromatic compound in the presence of an alkali metal hydroxide in an organic amide solvent has a nitrogen content (by weight) as extremely low as at most 800 ppm, preferably at most 600 ppm, more preferably at most 500 ppm, particularly preferably at most 400 ppm. The nitrogen content can be detected by subjecting a purified PAS after washing to elemental analysis. The nitrogen content in the PAS includes that derived from a minute amount of impurities and thus may vary with difference in washing method. However, most of the nitrogen content is derived from a chemically bonded nitrogen atom. No particular limitation is imposed on the lower limit of the nitrogen content in the PAS according to the present invention. However, it is about 50 ppm or often of the order of 100 ppm or 150 ppm. In order to reduce the nitrogen content in the PAS as much as possible, an excessive washing treatment and additional equipments are required, and so production cost becomes high. Accordingly, the actual lower limit of the nitrogen content is as described above.

In general, PAS shows a tendency to lower the nitrogen content as its melt viscosity becomes high. However, the result of analysis by the present inventors has revealed that a conventional PAS shows a nitrogen content value as great as 1,011 ppm even when it is, for example, PPS having a relatively high melt viscosity of 253 Pa·s (as measured at 310° C. and a shear rate of 1,216 sec$^{-1}$).

In a PAS having a too high nitrogen content, a terminal thereof is formed by an atomic group having a nitrogen atom and a carboxyl group, and so pseudo-crosslinking is formed by a sodium ion or the like to make its melt viscosity high. When such a PAS is subjected to melt processing, a continuous operation is difficult due to poor melt stability, and so problems such as end breakage in melt spinning are easy to be caused.

The PAS according to the present invention is low in nitrogen content, and the nitrogen content becomes lower as the melt viscosity thereof increases. Accordingly, the PAS according to the present invention is preferably such that in a melt viscosity range of the polymer from 140 to 300 Pa·s as measured at a temperature of 310° C. and a shear rate of 1,216 sec$^{-1}$ by controlling the resin pH to at most 6.0 before measuring the melt viscosity, the nitrogen content satisfies the following expression (II-1):

$$Y<-1.5X+800 \qquad (II\text{-}1)$$

wherein Y is a nitrogen content (ppm) in the resin, and X is a melt-viscosity of the poly(arylene sulfide).

When the melt viscosity exceeds 300 Pa·s, the nitrogen content preferably satisfies the following expression (II-2):

$$Y<350 \qquad (II\text{-}2)$$

The PAS according to the present invention is more preferably such that in a melt viscosity range of the polymer from 200 to 300 Pa·s as measured at a temperature of 310° C. and a shear rate of 1,216 sec$^{-1}$ by controlling the resin pH to at most 6.0 before measuring the melt viscosity, the nitrogen content satisfies the following expression (III-1):

$$Y<-1.5X+700 \qquad (III\text{-}1)$$

wherein Y is a nitrogen content (ppm) in the resin, and X is a melt viscosity (Pa·s) of the poly(arylene sulfide).

When the melt viscosity exceeds 300 Pa·s, the PAS according to the present invention preferably satisfies the following expression (III-2):

$$Y<250 \qquad (III\text{-}2)$$

The PAS according to the present invention is particularly preferably such that in a melt viscosity range of the polymer from 200 to 300 Pa·s as measured at a temperature of 310° C. and a shear rate of 1,216 sec$^{-1}$ by controlling the resin pH to at most 6.0 before measuring the melt viscosity, the nitrogen content satisfies the following expression (IV-1):

$$Y<-1.5X+650 \qquad (IV\text{-}1)$$

wherein Y is a nitrogen content (ppm) in the resin, and X is a melt viscosity (Pa·s) of the poly(arylene sulfide).

When the melt viscosity exceeds 300 Pa·s, the PAS according to the present invention preferably satisfies the following expression (IV-2):

$$Y<200 \qquad (IV\text{-}2)$$

The PASs obtained by the production process according to the present invention may be molded or formed into various products. The PAS is particularly preferably PPS.

11. Effects of the Invention:

According to the present invention, there is provided, in a production process of a PAS by polymerizing a sulfur source and a dihalo-aromatic compound in the presence of an alkali metal hydroxide in an organic amide solvent, a process for stably producing a high-purity PAS at high yield by using a sulfur source including an alkali metal hydrosulfide and inhibiting side reactions and decomposition reactions during a polymerization reaction.

According to the production process of the present invention, a PAS having high molecular weight (high melt viscosity) can be produced.

According to the production process of the present invention, a PAS markedly reduced in the content of low-boiling impurities that form the cause of generation of gasses upon melt processing can be produced with high production efficiency and without deterioration of profitability due to loss of raw materials, or the like. According to the present invention, there can also be provided a PAS markedly low in nitrogen content and little in variations of melt viscosity due to differences in post treatment conditions such as a washing liquid.

EXAMPLES

The present invention will hereinafter be described more specifically by the following Examples and Comparative Examples. Measuring methods of physical properties and the like are as follows.

(1) Yield:

Assuming that all the available sulfur component existing in a reaction vessel after a dehydration step was converted to a polymer, the weight (theoretical amount) of that polymer was used as a reference value to calculate out a proportion (% by weight) of the weight of a polymer actually collected to the reference value as a yield of the polymer.

(2) Melt Viscosity:

A melt viscosity was measured by using about 20 g of a dry polymer by means of Capirograph 1-C (manufactured by Toyo Seiki, Ltd.). At this time, a flat die of 1 mm in diameter× 10 mm in length was used as a capillary, and the temperature was set to 310° C. After the polymer sample was placed in the apparatus and held for 5 minutes, the melt viscosity was measured at a shear rate of 1,216 sec $^{-1}$.

(3) Measuring Method of pH of Mixture for Polymerization Reaction:

A reaction mixture was diluted to 1/10 with purified water (product of Kanto Chemical Co., Inc.) to measure its pH by means of a pH meter.

(4) Analyzing Method of Sulfur Source:

Sodium hydrosulfide (NaSH) and sodium sulfide (Na$_2$S) in an aqueous solution of a sulfur source were determined by finding an overall sulfur content by means of iodimetry, finding an amount of NaSH by means of a neutralization titration method and subtracting the amount of NaSH from the overall sulfur content to regard a value thus obtained as an amount of Na$_2$S.

(5) Weight Loss on Heating:

A dry polymer sample was placed in a thermogravimetric analyzer (TGATG50; manufactured by METTLER Co.) and heated from 150° C. to 350° C. at a heating rate of 10° C./min in an air atmosphere to measure its weight loss at this time. A less weight loss on heating indicates that the amount of gases generated upon melt process is less.

(6) Resin pH:

At room temperature (20° C.), about 6 g of a polymer sample, 15 ml of acetone and 30 ml of purified water (product of Kanto Chemical Co., Inc.) were placed in an Erlenmeyer flask, and the resultant mixture was shaken for 30 minutes by means of a shaker and then filtered through a separating funnel. A pH of a supernatant thereof was measured by means of a pH meter.

(7) Nitrogen Content:

About 1 mg of a polymer sample was precisely weighed to conduct elemental analysis on the sample by means of a micro nitrogen-sulfur analyzer (manufactured by ASTECH Corp., Model "ANTEK7000").

Example 1

After a 20-liter autoclave was charged with 5,700 g of N-methyl-2-pyrrolidone (hereinafter abbreviated as "NMP") and purged with nitrogen gas, the contents were heated up to 100° C. over about 1 hour while stirring them at 250 rpm by means of a stirrer. After reached 100° C., 1,990 g (containing 21.9 mol of NaSH and 0.4 mol of Na$_2$S) of an aqueous solution of a sulfur source and 1,000 g of NMP were added, and the resultant mixture was gradually heated up to 200° C. over about 2 hours to discharge 729 g of water, 1,370 g of NMP and 0.70 mol of hydrogen sulfide out of the system. Accordingly, an amount of an available sulfur source (available S) in the mixture remaining in the autoclave after the dehydration step was 21.6 mol, a Σ OH was 1.1 mol and a water content was 0.0 mol.

After the dehydration step, the mixture was cooled down to 170° C., and 3,236 g (1.015 mol/mol of the available S) of p-dichlorobenzene (hereinafter abbreviated as "pDCB") and 2,800 g of NMP were added. As a result, the temperature within the autoclave was cooled to 130° C. After the temperature was raised up to 180° C. over 30 minutes, addition of sodium hydroxide (NaOH) was begun to control the pH of the polymerization reaction system to 11.5-12.0. While stirring at 250 rpm by means of the stirrer, the temperature was successively raised up to 180° C. over 30 minutes and further over 60 minutes from 180° C. to 220° C. After conducting a reaction at that temperature for 60 minutes, the temperature was raised up to 230° C. over 30 minutes to conduct a reaction at 230° C. for 90 minutes, thereby conducting first-stage polymerization.

Throughout the first-stage polymerization step, an aqueous solution of NaOH having a concentration of 73.7% by weight was continuously added by means of a pump so as to keep the pH of the polymerization reaction system within a range of from 11.5 to 12.0. A conversion of pDCB at a point of time the first-stage polymerization had been completed was 90%. The aqueous solution of NaOH was added in an amount of 1,180 g in such a manner that the value of Σ OH/available S is 1.05 after the whole amount of the aqueous solution of NaOH is added. The water content after the whole amount of the aqueous solution of NaOH was added was 1.74 mol.

In the above-described polymerization reaction, the amount of the aqueous NaOH solution continuously added was controlled in such a manner that Y (Σ OH/available S) always satisfies the relationship of $0 \leq y-x<0.2$ to x. The amount of the dihalo-aromatic compound consumed was measured by sampling the reaction mixture at regular time intervals.

After completion of the first-stage polymerization, the number of revolutions of the stirrer was immediately raised to 400 rpm to introduce 340 g of water (total water content in the vessel=2.6 mol/mol of the available S) under pressure. After introducing water under pressure, the temperature was raised up to 260° C. in 1 hour to conduct a reaction at that temperature for 4 hours, thereby conducting second-stage polymerization. A conversion of pDCB at a point of time the second-stage polymerization had been completed was 99%. The pH of the system at a point of time the second-stage polymerization had been completed was 10.0.

After completion of the second-stage polymerization, the reaction mixture was cooled near to room temperature, and the contents were sifted through a screen of 100 mesh to collect a granular polymer. The granular polymer was washed 3 times with acetone, 3 times with water, with 0.3 wt. % acetic acid and then 4 times with water to obtain a washed polymer. This granular polymer was dried at 105° C. for 13 hours. The granular polymer obtained in such a manner was such that the yield was 95%, the melt viscosity was 151 Pa·s, and the weight loss on heating was 0.39% by weight. The results are shown in Table 1.

Comparative Example 1

After a 20-liter autoclave was charged with 5,700 g of NMP and purged with nitrogen gas, the contents were heated up to 100° C. over about 1 hour while stirring them at 250 rpm by means of a stirrer. After reached 100° C., 1,170 g of an aqueous solution of NaOH having a concentration of 74.7% by weight, 1,990 g (containing 21.8 mol of NaSH and 0.50 mol of $Na_2S$) of an aqueous solution of a sulfur source and 1,000 g of NMP were added, and the resultant mixture was gradually heated up to 200° C. over about 2 hours to discharge 945 g of water, 1,590 g of NMP and 0.31 mol of hydrogen sulfide out of the system. Accordingly, an amount of an available S in the mixture remaining in the autoclave after the dehydration step was 22.0 mol, a $\Sigma$ OH was 22.6 mol and a water content was 25.6 mol.

After the dehydration step, the mixture was cooled down to 170° C., and 3,283 g (1.015 mol/mol of the available S) of pDCB, 2,800 g of NMP, 133 g (total water content in the vessel=1.5 mol/mol of the available S) of water, and 23 g of NaOH having a concentration of 97% by weight were added in such a manner that the value of $\Sigma$ OH/available S is 1.05. As a result, the temperature within the autoclave was cooled to 130° C., and the pH of the system was 13.2. While stirring at 250 rpm by means of the stirrer, the temperature was successively raised up to 180° C. over 30 minutes and further over 60 minutes from 180° C. to 220° C. After conducting a reaction at that temperature for 60 minutes, the temperature was raised up to 230° C. over 30 minutes to conduct a reaction at 230° C. for 90 minutes, thereby conducting first-stage polymerization.

After completion of the first-stage polymerization, second-stage polymerization and post treatments such as washing and drying were conducted in the same manner as in Example 1. The pH of the system at a point of time the second-stage polymerization had been completed was 10.1. However, in this experimental example, the alkali metal hydroxide (NaOH) is charged at a time in accordance with the method known per se in the art. The granular polymer obtained in such a manner was such that the yield was 91%, the melt viscosity was 93 Pa·s, and the weight loss on heating was 0.62% by weight. The results are shown in Table 1.

Example 2

After a 20-liter autoclave was charged with 5,700 g of NMP and purged with nitrogen gas, the contents were heated up to 100° C. over about 1 hour while stirring them at 250 rpm by means of a stirrer. After reached 100° C., 584 g of an aqueous solution of NaOH having a concentration of 74.7% by weight, 1,990 g (containing 21.8 mol of NaSH and 0.50 mol of $Na_2S$) of an aqueous solution of a sulfur source and 1,000 g of NMP were added, and the resultant mixture was gradually heated up to 200° C. over about 2 hours to discharge 873 g of water, 1,307 g of NMP and 0.52 mol of hydrogen sulfide out of the system. Accordingly, an amount of an available S in the mixture remaining in the autoclave after the dehydration step was 21.8 mol, a $\Sigma$ OH was 11.9 mol and a water content was 11.1 mol.

After the dehydration step, the mixture was cooled down to 170° C., and 3,253 g (1.015 mol/mol of the available S) of pDCB, 2,800 g of NMP, 34.9 g of NaOH having a concentration of 97% by weight and 70 g of water were added. As a result, the temperature within the autoclave was cooled to 130° C. At this time, the total water content in the vessel was 0.7 mol/mol of the available S. While stirring at 250 rpm by means of the stirrer, the temperature was successively raised up to 180° C. over 30 minutes. At this time, the pH of the polymerization reaction system was 12.5. The temperature was further raised over 60 minutes from 180° C. to 220° C. After conducting a reaction at that temperature for 60 minutes, the temperature was raised up to 230° C. over 30 minutes to conduct a reaction at 230° C. for 90 minutes, thereby conducting first-stage polymerization.

At a point of time 30 minutes had elapsed after reached 220° C., 545.7 g (10.2 mol; 0.47 mol/mol of the available S) of an aqueous solution of NaOH having a concentration of 74.8 wt. % was added. The pH of the polymerization reaction system at a point of time the second-stage polymerization had been completed was 12.1. The water content after the aqueous solution of NaOH was added was 1.45 mol.

After completion of the first-stage polymerization, second-stage polymerization and post treatments such as washing and drying were conducted in the same manner as in Comparative Example 1. The granular polymer obtained in such a manner was such that the yield was 93%, the melt viscosity was 84 Pa·s, and the weight loss on heating was 0.48% by weight. In this experimental example, y–x was 0.5 on the maximum. The results are shown in Table 1.

Comparative Example 2

After a 20-liter autoclave was charged with 5,700 g of NMP and purged with nitrogen gas, the contents were heated up to 100° C. over about 1 hour while stirring them at 250 rpm by means of a stirrer. After reached 100° C., 1,990 g (containing 21.7 mol of NaSH and 0.60 mol of $Na_2S$) of an aqueous solution of a sulfur source and 1,000 g of NMP were added, and the resultant mixture was gradually heated up to 200° C. over about 2 hours to discharge 706 g of water, 1,113 g of NMP and 0.70 mol of hydrogen sulfide out of the system. Accordingly, an amount of an available S in the mixture remaining in the autoclave after the dehydration step was 21.6 mol, a $\Sigma$ OH was 1.3 mol and a water content was 1.1 mol.

After the dehydration step, the mixture was cooled down to 170° C., and 3,227 g (1.015 mol/mol of the available S) of pDCB and 2,800 g of NMP were added. As a result, the temperature within the autoclave was cooled to 130° C. After the temperature was raised up to 180° C. over 30 minutes, addition of an alkali metal hydroxide was begun to control the pH of the polymerization reaction system to 12.0. While stirring at 250 rpm by means of the stirrer, the temperature was successively raised up to 180° C. over 30 minutes and further over 60 minutes from 180° C. to 220° C. After conducting a reaction at that temperature for 60 minutes, the temperature was raised up to 230° C. over 30 minutes to conduct a reaction at 230° C. for 90 minutes, thereby conducting first-stage polymerization.

In the first-stage polymerization, the amount of NaOH added was controlled in such a manner that the pH of the system includes a range lower than 7 after the temperature reaches 220° C. As a result, upon completion of the first-stage polymerization, rise in pressure due to a decomposition reaction of a polymer occurred, and so the polymerization was stopped on the way. Incidentally, in this experimental example, the amount of NaOH added is controlled so as to include a case where y–x becomes minus. The results are shown in Table 1.

TABLE 1

|  | Ex. 1 | Comp. Ex. 1 | Ex. 2 | Comp. Ex. 2 |
|---|---|---|---|---|
| Melt viscosity [Pa·s] | 151 | 93 | 84 | Decomposed |
| Yield of polymer [%] | 95 | 91 | 93 | Decomposed |
| Weight loss on heating [wt. %] | 0.39 | 0.62 | 0.48 | — |

As apparent from the experimental results shown in Table 1, according to the production processes (Examples 1 and 2) of the present invention, PASs low in weight loss on heating and high in quality can be obtained at high yield. As apparent from the comparative results between Example 1 and Comparative Example 1, according to the production process (Example 1) of the present invention, a PAS having a high melt viscosity (high molecular weight) compared with the conventional process (Comparative Example 1) can also be obtained.

Example 3-1

First-stage polymerization and second-stage polymerization were conducted in exactly the same manner as in Example 1. After completion of the second-stage polymerization, the reaction mixture was cooled near to room temperature, and the contents were then sifted through a screen of 100 mesh to collect a granular polymer. The granular polymer was then washed 3 times with aqueous acetone (water content=3% by weight), 3 times with water and additionally with 0.3 wt. % acetic acid. Thereafter, the polymer was washed additionally 4 times with water to obtain a washed granular polymer. The granular polymer was dried at 105° C. for 13 hours. The granular polymer obtained in such a manner was such that the melt viscosity was 145 Pa·s, the resin pH was 5.9, and the nitrogen content was 371 ppm. The results are shown in Table 2.

Example 3-2

First-stage polymerization and second-stage polymerization were conducted in exactly the same manner as in Example 1. After completion of the second-stage polymerization, the reaction mixture was cooled near to room temperature, and the contents were then sifted through a screen of 100 mesh to collect a granular polymer. The granular polymer was then washed 3 times with aqueous acetone (water content=3% by weight) and then 5 times with water to obtain a washed granular polymer. The granular polymer was dried at 105° C. for 13 hours. The granular polymer obtained in such a manner was such that the melt viscosity was 171 Pa·s, the resin pH was 9.9, and the nitrogen content was 365 ppm. The results are shown in Table 2.

Example 4-1

First-stage polymerization and second-stage polymerization were conducted in exactly the same manner as in Example 1. After completion of the second-stage polymerization, the reaction mixture was cooled near to room temperature, and the contents were then sifted through a screen of 100 mesh to collect a granular polymer. The granular polymer was then washed 3 times with reagent (absolute) acetone, 3 times with water and then with 0.3 wt. % acetic acid. Thereafter, the polymer was washed additionally 4 times with water to obtain a washed granular polymer. The granular polymer was dried at 105° C. for 13 hours. The granular polymer obtained in such a manner was such that the melt viscosity was 151 Pa·s, the resin pH was 5.7, and the nitrogen content was 470 ppm. The results are shown in Table 2.

Example 4-2

First-stage polymerization and second-stage polymerization were conducted in exactly the same manner as in Example 1. After completion of the second-stage polymerization, the reaction mixture was cooled near to room temperature, and the contents were then sifted through a screen of 100 mesh to collect a granular polymer. The granular polymer was then washed 3 times with reagent (absolute) acetone and then 5 times with water to obtain a washed granular polymer. The granular polymer was dried at 105° C. for 13 hours. The granular polymer obtained in such a manner was such that the melt viscosity was 175 Pa·s, the resin pH was 10.2, and the nitrogen content was 481 ppm. The results are shown in Table 2.

Example 5-1

First-stage polymerization was conducted in exactly the same manner as in Example 1. After completion of the first-stage polymerization, the number of revolutions of the stirrer was immediately raised to 400 rpm to introduce 340 g of water (total water content in the vessel=2.6 mol/mol of the available S) under pressure at 230° C. After introducing water under pressure, the temperature was raised up to 255° C. in 1 hour, and the contents were held for 3 hours at that temperature. The contents were then quenched (the temperature was lowered down to about 240° C.) and immediately adjusted to a temperature of 245° C. to hold them for 4.0 hours. A conversion of pDCB at a point of time the second-stage polymerization had been completed was 99%. The pH of the polymerization reaction system at a point of time the second-stage polymerization had been completed was 9.9.

After completion of the second-stage polymerization, the reaction mixture was cooled near to room temperature, and the contents were sifted through a screen of 100 mesh to collect a granular polymer. The granular polymer was then washed 3 times with aqueous acetone (water content=3% by weight), 3 times with water and additionally with 0.3 wt. % acetic acid. Thereafter, the polymer was washed additionally 4 times with water to obtain a washed granular polymer. The granular polymer was dried at 105° C. for 13 hours. The granular polymer obtained in such a manner was such that the melt viscosity was 360 Pa·s, the resin pH was 5.9, and the nitrogen content was 236 ppm. The results are shown in Table 2.

Example 5-2

First-stage polymerization and second-stage polymerization were conducted in exactly the same manner as in Example 5-1. After completion of the second-stage polymerization, the reaction mixture was cooled near to room temperature, and the contents were then sifted through a screen of 100 mesh to collect a granular polymer. The granular polymer was then washed 3 times with aqueous acetone (water content=3% by weight) and then 5 times with water to obtain a washed granular polymer. The granular polymer was dried at 105° C. for 13 hours. The granular polymer obtained in such a manner was such that the melt viscosity was 449 Pa·s, the resin pH was 9.9, and the nitrogen content was 250 ppm. The results are shown in Table 2.

Example 5-3

The granular polymer obtained in Example 5-2 was washed twice with reagent (absolute) acetone and then with 3 wt. % acetic acid. The granular polymer was washed additionally 4 times with water to obtain a washed polymer. The washed polymer was dried at 105° C. for 13 hours. The granular polymer obtained in such a manner was such that the melt viscosity was 372 Pa·s, the resin pH was 5.8, and the nitrogen content was 210 ppm. The results are shown in Table 2.

Comparative Example 3-1

After a 20-liter autoclave was charged with 5,700 g of NMP and purged with nitrogen gas, the contents were heated up to 100° C. over about 1 hour while stirring them at 250 rpm by means of a stirrer. After reached 100° C., 1,170 g of an aqueous solution of NaOH having a concentration of 74.7% by weight, 1,990 g (containing 21.8 mol of NaSH and 0.50 mol of $Na_2S$) of an aqueous solution of a sulfur source, 549 g of sodium acetate and 1,000 g of NMP were added, and the resultant mixture was gradually heated up to 200° C. over about 2 hours to discharge 945 g of water, 1,590 g of NMP and 0.31 mol of hydrogen sulfide out of the system. Accordingly, an amount of an available S in the mixture remaining in the autoclave after the dehydration step was 22.0 mol, a $\Sigma$ OH was 22.6 mol and a water content was 25.6 mol.

After the dehydration step, the mixture was cooled down to 170° C., and 3,253 g (1.015 mol/mol of the available S) of pDCB, 2,800 g of NMP, 133 g (total water content in the vessel=1.5 mol/mol of the available S) of water, and 23 g of NaOH having a concentration of 97% by weight were added in such a manner that the value of $\Sigma$ OH/available S is 1.05. As a result, the temperature within the autoclave was cooled to 130° C., and the pH of the system was 13.2. While stirring at 250 rpm by means of the stirrer, the temperature was successively raised up to 180° C. over 30 minutes and further over 60 minutes from 180° C. to 220° C. After conducting a reaction at that temperature for 60 minutes, the temperature was raised up to 230° C. over 30 minutes to conduct a reaction at 230° C. for 90 minutes, thereby conducting first-stage polymerization.

After completion of the first-stage polymerization, the number of revolutions of the stirrer was immediately raised to 400 rpm, the temperature was raised up to 260° C. in 1 hour to conduct a reaction for 3 hours at that temperature, thereby conducting second-stage polymerization. The pH of the system at a point of time the second-stage polymerization had been completed was 10.5.

After completion of the second-stage polymerization, the reaction mixture was cooled near to room temperature, and the contents were sifted through a screen of 100 mesh to collect a granular polymer. The granular polymer was washed 3 times with reagent (absolute) acetone, 3 times with water and additionally with 0.3 wt. % acetic acid. Thereafter, the polymer was washed additionally 4 times with water to obtain a washed granular polymer. This granular polymer was dried at 105° C. for 13 hours. The granular polymer obtained in such a manner was such that the melt viscosity was 104 Pa·s, the resin pH was 6.0, and the nitrogen content was 1,027 ppm. The results are shown in Table 2.

Comparative Example 3-2

First-stage polymerization and second-stage polymerization were conducted in exactly the same manner as in Comparative Example 3-1. After completion of the second-stage polymerization, the reaction mixture was cooled near to room temperature, and the contents were then sifted through a screen of 100 mesh to collect a granular polymer. The granular polymer was then washed 3 times with reagent (absolute) acetone and then 5 times with water to obtain a washed granular polymer. The granular polymer was dried at 105° C. for 13 hours. The granular polymer obtained in such a manner was such that the melt viscosity was 201 Pa·s, the resin pH was 10.5, and the nitrogen content was 1,008 ppm. The results are shown in Table 2.

TABLE 2

| | N content (ppm) | Resin pH | Melt viscosity (Pa·s) | MDL/MDH |
|---|---|---|---|---|
| Ex. 3-1 | 371 | 5.9 | 145 | 0.85 |
| Ex. 3-2 | 365 | 9.9 | 171 | |
| Ex. 4-1 | 470 | 5.7 | 151 | 0.86 |
| Ex. 4-2 | 481 | 10.2 | 175 | |
| Ex. 5-1 | 236 | 5.9 | 360 | 0.80 |
| Ex. 5-2 | 250 | 9.9 | 449 | |
| Ex. 5-3 | 210 | 5.8 | 372 | 0.83 |
| Ex. 5-2 | 250 | 9.9 | 449 | |
| Comp. Ex. 3-1 | 1027 | 6.0 | 104 | 0.52 |
| Comp. Ex. 3-2 | 1008 | 10.5 | 201 | |

As apparent from the results shown in Table 2, it is understood that the PASs (Examples 3 to 5) according to the present invention are markedly reduced in nitrogen content compared with the PASs (Comparative Example 3) synthesized in accordance with the processes known per se in the art and have a stable melt viscosity irrespective of differences in washing liquid and resin pH due to difference in washing method.

INDUSTRIAL APPLICABILITY

According to the present invention, there are provided processes for producing PASs markedly reduced in the content of low-boiling impurities that form the cause of generation of gasses upon melt processing with high production efficiency and without deterioration of profitability due to loss of raw materials, or the like. The PASs according to the present invention are extremely low in nitrogen content and little in variations of melt viscosity due to differences in washing liquid and resin pH and thus have excellent melt processing ability.

The PASs according to the present invention can be molded or formed into various injection-molded products or extruded products such as sheets, films, fibers and pipes either singly or by incorporating various kinds of inorganic fillers, fibrous fillers and/or various kinds of synthetic resins, if desired, as they are or after subjected to oxidative crosslinking.

The invention claimed is:
1. A process for producing a poly(arylene sulfide) by polymerizing a sulfur source and a dihalo-aromatic compound in the presence of an alkali metal hydroxide in an organic amide solvent, which comprises:

(1) a dehydration step of charging, into a reaction vessel, the organic amide solvent and the sulfur source comprising an alkali metal hydrosulfide alone or a mixture of 90 to 99.5 mol % of an alkali metal hydrosulfide and 0.5 to 10 mol % of an alkali metal sulfide, and a part of an overall charged amount of the alkali metal hydroxide as needed, and heating a mixture containing these components to discharge at least a part of a distillate containing water from the interior of the system containing the mixture to the exterior of the system, and (2) a polymerization step of mixing the mixture remaining within the system after the dehydration step with a dihalo-aromatic compound, heating a mixture for polymerization reaction containing these components to subject the sulfur source (hereinafter referred to as "available sulfur source") and the dihalo-aromatic compound to a polymerization reaction, and adding the alkali metal hydroxide to the mixture for polymerization reaction continuously or in portions to control the pH of the mixture for polymerization reaction within a range of from 7 to 12.5 from the beginning to the end of the polymerization reaction, wherein in the polymerization step, the pH of the mixture for polymerization reaction is measured by collecting the reaction mixture, diluting it to 1/10 with ion-exchanged water and measuring the pH of the diluted solution.

2. The production process according to claim 1, wherein in the dehydration step, a mixture of 97 to 99.5 mol % of the alkali metal hydrosulfide and 0.5 to 3 mol % of an alkali metal sulfide is charged as the sulfur source comprising the alkali metal hydrosulfide.

3. The production process according to claim 1, wherein in the dehydration step, the mixture is heated to 100 to 250° C. to discharge at least a part of the distillate containing water from the interior of the system containing the mixture to the exterior of the system.

4. The production process according to claim 1, wherein in the polymerization step, the alkali metal hydroxide is added to the mixture for polymerization reaction continuously or in portions to control the pH of the mixture for polymerization reaction within a range of from 9 to 12.1 from the beginning to the end of the polymerization reaction.

5. The production process according to claim 1, wherein in the polymerization step, the alkali metal hydroxide is added to the mixture for polymerization reaction continuously or in portions so as to satisfy the following expression (I):

$$0 \leq y-x < 1.1 \quad (I)$$

wherein y=Σ OH/available S, Σ OH being a cumulative molar amount of a molar amount of an alkali metal sulfide contained in the sulfur source charged in the dehydration step, a molar amount of the alkali metal hydroxide added in the dehydration step, a molar amount of hydrogen sulfide volatilized out of the system in the dehydration step, and a molar amount of the alkali metal hydroxide added continuously or in portions in the polymerization step, and the available S being a molar amount of an available sulfur source contained in the mixture remaining in the system after the dehydration step, and x is a consumption rate of the dihalo-aromatic compound, i.e., (a molar amount of the dihalo-aromatic compound consumed in the polymerization step)/(a molar amount of the dihalo-aromatic compound charged).

6. The production process according to claim 5, wherein the alkali metal hydroxide is added to the mixture for polymerization reaction continuously or in portions in such a manner that the (y-x) value in the expression (I) satisfies a range of from 0 to smaller than 0.2.

7. The production process according to claim 1, wherein in the production step, the polymerization reaction is conducted by an at least two-stage polymerization process comprising:

(A) Step 1 of heating the mixture for polymerization reaction to 170 to 270° C. in the presence of water in a proportion of 0.0 to 2.0 mol per mol of the available sulfur source to conduct a polymerization reaction, thereby forming a prepolymer wherein a conversion of the dihalo-aromatic compound is 50 to 98%, and (B) Step 2 of controlling the amount of water in the mixture for polymerization reaction so as to bring about a state that water exists in a proportion of 2.0 to 10 mol per mol of the available sulfur source, and heating the reaction system to 245 to 290° C., thereby continuing the polymerization reaction.

8. The production process according to claim 1, wherein in the production step, the dihalo-aromatic compound is mixed in such a manner that the amount of the dihalo-aromatic compound charged falls within a range of from 0.9 to 1.50 mol per mol of the available sulfur source.

9. The production process according to claim 8, wherein in the production step, the dihalo-aromatic compound is mixed in such a manner that the amount of the dihalo-aromatic compound charged falls within a range of from 1.00 to 1.09 mol per mol of the available sulfur source.

10. The production process according to claim 1, wherein in the dehydration step and production step, the overall charged amount of the alkali metal hydroxide is controlled in such a manner that the Σ OH value, (being a cumulative molar amount of a molar amount of an alkali metal sulfide contained in the sulfur source charged in the dehydration step, a molar amount of the alkali metal hydroxide added in the dehydration step, a molar amount of hydrogen sulfide volatilized out of the system in the dehydration step, and a molar amount of the alkali metal hydroxide added continuously or in portions in the polymerization step, falls within a range of from 1.0 to 1.1 mol per mol of the available sulfur source contained in the mixture remaining in the system after the dehydration step.

11. The production process according to claim 10, wherein in the dehydration step and production step, the overall charged amount of the alkali metal hydroxide is controlled in such a manner that the Σ OH value falls within a range of from 1.02 to 1.08 mol per mol of the available sulfur source.

* * * * *

UNITED STATES PATENT AND TRADEMARK OFFICE
CERTIFICATE OF CORRECTION

PATENT NO. : 7,504,476 B2 Page 1 of 1
APPLICATION NO. : 10/542543
DATED : March 17, 2009
INVENTOR(S) : Hirohito Kawama et al.

It is certified that error appears in the above-identified patent and that said Letters Patent is hereby corrected as shown below:

Column 12, Line 37, change "$\leqq$" to -- $\leq$ --

Column 12, Line 60, change both "$\leqq$" to -- $\leq$ --

Column 12, Line 61, change "$\leqq$" to -- $\leq$ --

Column 18, Line 41, change "$\leqq$" to -- $\leq$ --

Column 25, Line 48, change "$\leqq$" to -- $\leq$ --

Signed and Sealed this

Second Day of June, 2009

JOHN DOLL
*Acting Director of the United States Patent and Trademark Office*